(12) United States Patent
Voo

(10) Patent No.: US 7,751,139 B1
(45) Date of Patent: Jul. 6, 2010

(54) CIRCUITS, SYSTEMS, AND METHODS FOR CALIBRATION OF BIAS ACROSS A MAGNETO-RESISTIVE SENSOR

(75) Inventor: Thart Fah Voo, Singapore (SG)

(73) Assignee: Marvell International Ltd., Hamilton (BE)

( * ) Notice: Subject to any disclaimer, the term of this patent is extended or adjusted under 35 U.S.C. 154(b) by 449 days.

(21) Appl. No.: 11/893,163

(22) Filed: Aug. 14, 2007

Related U.S. Application Data (60) Provisional application No. 60/822,690, filed on Aug. 17, 2006, provisional application No. 60/826,098, filed on Sep. 19, 2006.

(51) Int. Cl.
*G11B 5/03* (2006.01)

(52) U.S. Cl. ............... 360/66; 360/31; 360/67; 324/207.21

(58) Field of Classification Search ............... None
See application file for complete search history.

(56) References Cited

U.S. PATENT DOCUMENTS 6,255,898 B1 * 7/2001 Ono et al. ............... 327/551
6,930,531 B2 * 8/2005 Barnett ............... 327/346
2007/0242384 A1 * 10/2007 Contreras et al. ............... 360/66

* cited by examiner

*Primary Examiner*—Jason C Olson

(57) ABSTRACT

Circuits, systems, and methods for generating and calibrating bias for a magneto-resistive (MR) sensor. The circuit relates to a preamplifier circuit in a magnetic storage system, including an amplifier having an input coupled to a first MR sensor node, a first feedback path comprising a feedback resistor, the path configured to receive an amplifier output from the amplifier and to provide a feedback output to the first MR sensor node, a charging circuit configured to generate a current, apply the current to the first MR sensor node, and sample a voltage between the first MR sensor node and a second MR sensor node to produce a sampled voltage, the charging circuit operating when the feedback path is activated, and a bias circuit configured to apply a bias voltage across the first and second MR sensor nodes and to adjust the bias voltage to match the sampled voltage, the bias circuit operating when the feedback path is deactivated. The present invention advantageously provides for fast and accurate calibration of bias across an MR sensor that compensates for bias error introduced by the feedback path.

40 Claims, 9 Drawing Sheets

CIRCUITS, SYSTEMS, AND METHODS FOR CALIBRATION OF BIAS ACROSS A MAGNETO-RESISTIVE SENSOR

RELATED APPLICATIONS

This application claims the benefit of U.S. Provisional Application No. 60/822,690, filed Aug. 17, 2006, and U.S. Provisional Application No. 60/826,098, filed Sep. 19, 2006, each of which is incorporated herein by reference.

FIELD OF THE INVENTION

The present invention generally relates to the field of magnetic storage systems. More specifically, embodiments of the present invention pertain to circuits, systems, and methods for fast and accurate generation of bias across magneto-resistive (MR) sensors.

DISCUSSION OF THE BACKGROUND

Magnetic storage systems, such as hard disk drives (HDDs), are used as mass storage in a wide variety of devices, including but not limited to personal computers, digital versatile disc (DVD) players, high definition television (HDTV) receivers, vehicle control systems, cellular or mobile telephones, television set top boxes, and portable media players. As these magnetic storage systems become smaller and/or attain higher data storage capacities, the density of data on the magnetic storage medium becomes higher.

A typical HDD includes magnetic storage media of one or more flat disks, called platters (sometimes also "disks" or "discs"). The platters are generally formed of two main substances: a substrate material that gives it structure and rigidity, and a magnetic media coating which holds the magnetic impulses (or moments) that represent data. A typical HDD further includes a read/write head, generally a magnetic transducer which can sense and/or change the magnetic fields stored on the platters. The read/write head is attached to a slider, generally an armature capable of placing the read/write head at a desired location over the platter.

The areal recording density of magnetic storage media, particularly of hard disk drives (HDDs), has increased greatly over time, and currently reaches several Gb/in$^2$ or more. Such improvement in areal density derives largely from innovation and improvement of various elemental technologies such as use of magneto-resistive storage systems, use of recording magnetic pole materials having high saturation magnetic flux densities, improvements in the manufacturing of magnetic sensor heads with a narrow track width, use of magnetic sensor heads having a narrower gap between the head the magnetic storage medium, miniaturization and high-precision processing of slider mechanisms, high-precision servo technology, and development of novel modulation/demodulation technologies. In addition, with respect to magnetic storage media, there have been advances in elemental technologies such as smoothing and flattening of the media surface (facilitating low flying height operation of the magnetic sensor head over the medium), reduction in magnetization transition width due to increases in coercivity and decreases in the thickness of magnetic layers, and medium noise reduction due to decreases in exchange interaction between magnetic grains and reductions in magnetic grain size.

As the density of data on the magnetic storage medium increases, the strength of the magnetic fields generally decrease, in order to minimize interference. Higher areal density in magnetic storage media generally requires advanced read/write transducer head design with compatible advanced preamplification circuit architectures. Advanced read head technologies such as giant magneto-resistive (GMR), tunneling magneto-resistive (TuMR), and current perpendicular to plane (CPP) with decreasingly small nano-scale dimensions require very precise electronic biasing to function properly and reliably. Due to the very weak signals detected by these read head sensors, extreme attention has to be paid to noise and other errors introduced by the preamplification system.

Figure 1A:
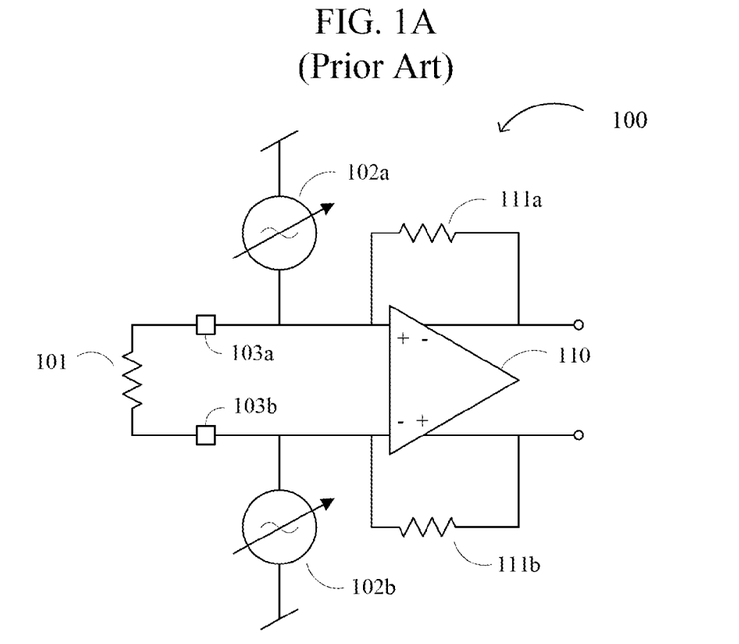
FIG. 1A is a diagram showing a conventional differential MR sensor preamplification circuit with feedback circuits and conventional current bias circuits.
Figure 1B:
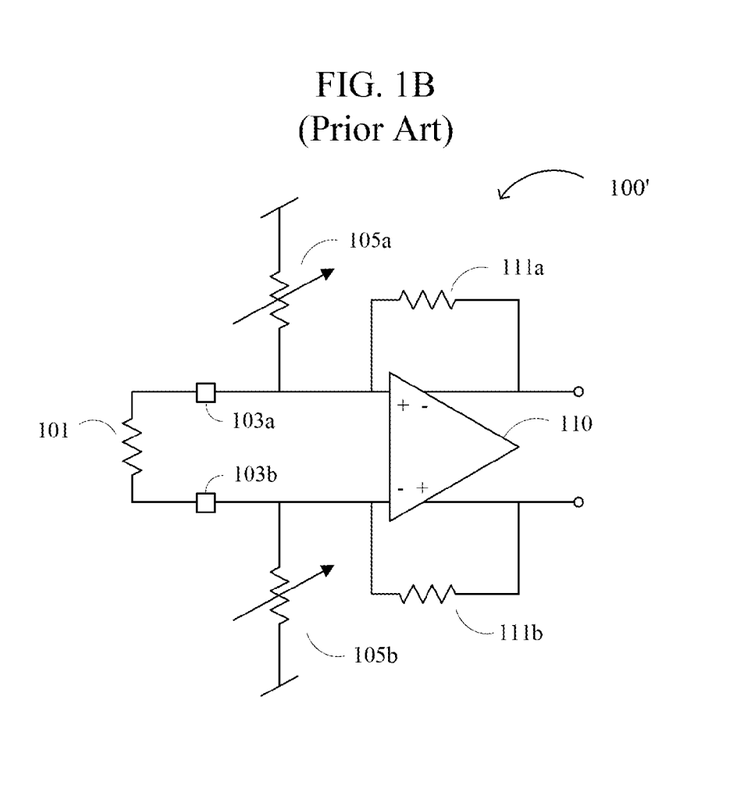
FIG. 1B is a diagram showing a conventional differential MR sensor preamplification circuit with feedback circuits and conventional voltage bias circuits.

Referring now to FIG. 1A, a conventional differential magnetic storage reading circuit 100 having current bias generators 102a and 102b is shown. MR sensor 101 is a magneto-resistive read/write transducer (e.g., positioned over a magnetic storage medium by a slider/armature apparatus, not shown). Variable current bias generator 102a provides a bias current at both nodes 103a and 103b of MR sensor 101. MR sensor 101 may be coupled to amplifier 110, where changes in the resistance of the MR sensor (RMR) caused by changes in the magnetic field on the storage medium are amplified to read data from the storage medium. Similarly, FIG. 1B shows a conventional differential magnetic storage reading circuit 100 having voltage bias generators 105a and 105b.

Figure 2A:
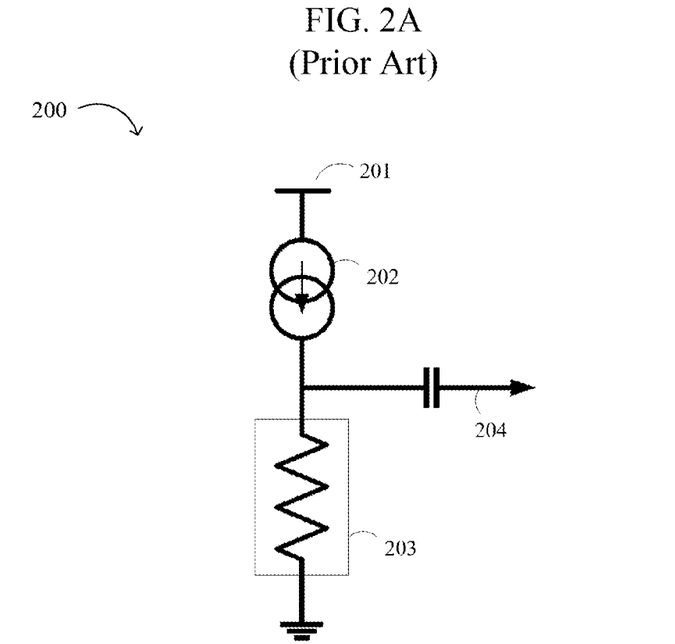
FIG. 2A is a diagram showing a conventional current bias circuit.

Two types of basic biasing schemes are currently used in conventional preamplifiers. Referring now to FIG. 2A, a conventional current bias block 200 is shown. Current bias block 200 may comprise current source 202, configured to provide a desired current to a node of MR sensor 203. In differential circuit applications, two bias blocks may be used to provide a bias current at each end of MR sensor 203. The current source 202 may comprise, for example, a current digital-to-analog convert (IDAC), such as a conventional 10-bit IDAC. The advantages of a current bias circuit include simple implementation and programming resolution that is independent of RMR.

Figure 2B:
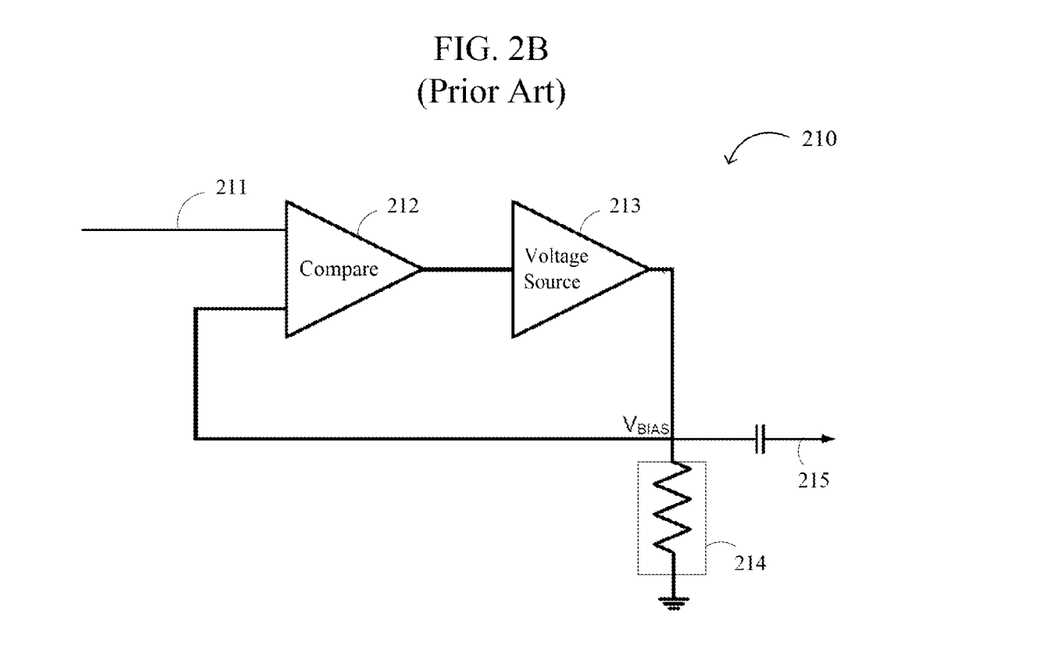
FIG. 2B is a diagram showing a conventional voltage bias circuit.

Referring now to FIG. 2B, a conventional voltage bias block 210 is shown. Voltage source 213 provides bias voltage $V_{BIAS}$ to MR sensor 214. Comparison circuit 212 compares $V_{BIAS}$ to a desired (programmed) voltage 211, and adjusts voltage source 213 accordingly to maintain the desired voltage. A conventional voltage bias block advantageously provides bias voltage and programmed resolution of the bias voltage that are independent of the resistance of the MR sensor (RMR). However, the voltage bias block generally produces larger bias noise than other biasing schemes, and requires a relatively complicated implementation.

As the areal density of magnetic storage devices increases, and the strength of the magnetic field on such devices decreases, the voltage and/or current bias applied to the MR sensor becomes smaller and must be more finely controlled. Thus, the influence of feedback resistors (e.g., feedback resistors 111a and 111b) on the MR sensor bias becomes more significant. Therefore, it would be advantageous to calibrate the MR sensor bias to account for any error introduced by feedback resistors.

SUMMARY OF THE INVENTION

Embodiments of the present invention relate to circuits, systems, and methods for generating and calibrating bias for a magneto-resistive (MR) sensor. The circuit relates to a preamplifier circuit in a magnetic storage system, including an amplifier having an input coupled to a first MR sensor node (e.g., a node in an integrated circuit for coupling to an external MR sensor in a magnetic storage system), a first feedback path comprising a feedback resistor, the path configured to receive an amplifier output from the amplifier and to provide a feedback output to the first MR sensor node, a charging circuit configured to generate a current, apply the current to the first MR sensor node, and sample a voltage between the first MR sensor node and a second MR sensor node to produce a sampled voltage, the charging circuit operating when the feedback path is in an inactive state, and a bias circuit configured to apply a bias voltage across the first and second MR sensor nodes and to adjust the bias voltage to match the sampled voltage, the bias circuit operating when the switch path is in an active state. Thus, the bias circuit may be calibrated to adjust the bias applied to an MR sensor to compensate for any bias error that may be introduced by the feedback path.

The charging circuit may include a current digital-to-analog converter (DAC). In a further embodiment, the charging circuit has a charging control input and is further configured to generate the current in response to the charging control input. In one embodiment, the charging control input may comprise a digital representation of a predetermined current (e.g., a programmed or desired bias current). Alternatively, the charging control input may comprise a reference voltage, or the charging circuit may comprise a voltage source configured to generate a reference voltage in accordance with the charging control input. For example, the voltage source may comprise a voltage digital-to-analog converter and the charging control input may comprise a digital representation of a predetermined voltage (e.g., a programmed or desired bias voltage).

In a further embodiment, the charging circuit comprises a charging comparison circuit configured to compare the reference voltage to the voltage across the MR sensor nodes. In a still further embodiment, the charging circuit is configured to adjust the current in response to an output of the charging comparison circuit. In one exemplary implementation, the charging circuit comprises a sampling capacitor configured to charge up to the sampled voltage. The capacitor may have a first node coupled to the first MR sensor node through a first sampling switch and a second node coupled to the second MR sensor node through a second sampling switch.

In another embodiment, the circuit includes a control circuit configured to cause the feedback path to enter an inactive state, activate the charging circuit, cause the feedback path to enter an inactive state, and activate the bias circuit. In a further embodiment, the control circuit comprises a bias comparison circuit configured to compare the sampled voltage (e.g., the voltage across the sampling capacitor) to the bias voltage. In one exemplary embodiment, the bias circuit includes a current digital-to-analog converter (DAC) having a digital control input, and the controller is configured to change a value of the digital control input in response to an output of the bias comparison circuit.

In one embodiment, the first feedback includes a feedback switch, and the feedback path is in the active state when the feedback switch is closed and in the inactive state when the feedback switch is open. In an alternative embodiment, the circuit includes an output driver receiving the amplifier output, wherein the feedback path is in the active state when the output driver is active (e.g., when the output driver is turned on) and in the inactive state when the output driver is inactive.

In some implementations, the amplifier may be a single-ended amplifier, and the second MR sensor node may be coupled to a ground potential. However, in a preferred embodiment, the amplifier comprises a differential amplifier. Thus, the preamplifier circuit may further comprise a second feedback path configured to receive a second output from the differential amplifier and to provide a second feedback output to a second node of the MR sensor.

The systems may include those that comprise the present circuit and/or any circuit embodying the inventive concepts described herein For example, in one embodiment, the invention relates to an integrated circuit comprising the present preamplifier circuit. In another embodiment, the invention relates to a magnetic storage system comprising a magnetic storage medium, the present preamplifier circuit, and an MR sensor coupled to the first and second MR nodes of the preamplifier circuit, wherein the MR sensor is configured to sense changes in a magnetic field on the magnetic storage medium. Specifically the present invention relates to a hard disk drive comprising the preamplifier circuit presented herein.

The method of calibrating bias for a magneto-resistive (MR) sensor includes the steps of deactivating a feedback path between an amplifier output and the MR sensor and, while the feedback path is deactivated, producing an electrical current, applying the electrical current to the MR sensor, and sampling a voltage across the MR sensor to produce a sampled voltage, then activating the feedback path and, while the feedback path is activated, applying a bias voltage to the MR sensor, comparing the bias voltage to the sampled voltage, and adjusting the bias voltage to match the sampled voltage.

In another embodiment, producing the electrical current comprises generating the electrical current in response to a charging control input. The charging control input may comprise a digital representation of a predetermined current (e.g., a programmed or desired bias current). Alternatively, the charging control input may comprise a reference voltage, or the method may comprise generating a reference voltage in accordance with the charging control input. In a further embodiment, the method comprises comparing the reference voltage to the voltage across the MR sensor. In a still further embodiment, the method includes adjusting the current in response to the comparing step.

In a preferred embodiment, sampling the voltage across the MR sensor comprises charging a sampling capacitor up to the sampled voltage. Thus, the charging step may comprise coupling a first node of the capacitor to a first node of the MR sensor and coupling a second node of the capacitor to a second node of the MR sensor. In another embodiment, the feedback path comprises a feedback switch and a feedback resistor and the step of deactivating the feedback path comprises opening the feedback switch. In an alternative embodiment, an output driver receives the amplifier output, and the step of deactivating the feedback path comprises deactivating said output driver. In yet another embodiment, the adjusting step comprises changing the bias voltage by a relatively small amount, and repeating the comparing and adjusting until the bias voltage is substantially equal to the sampled voltage.

The present invention advantageously provides for fast and accurate calibration of bias across an MR sensor that compensates for bias error introduced by the feedback path. These and other advantages of the present invention will become readily apparent from the detailed description of preferred embodiments below.

DETAILED DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications, and equivalents that may be included within the spirit and scope of the invention as defined by the appended claims. Furthermore, in the following detailed description of the present invention, numerous specific details are set forth in order to provide a thorough understanding of the present invention. However, it will be readily apparent to one skilled in the art that the present invention may be practiced without these specific details. In other instances, well-known methods, procedures, components, and circuits have not been described in detail so as not to unnecessarily obscure aspects of the present invention.

Some portions of the detailed descriptions which follow are presented in terms of processes, procedures, logic blocks, functional blocks, processing, and other symbolic representations of operations on data bits, data streams, or waveforms within a computer, processor, controller, and/or memory. These descriptions and representations are generally used by those skilled in the data processing arts to effectively convey the substance of their work to others skilled in the art. A process, procedure, logic block, functional block, operation, etc., is herein, and is generally, considered to be a self-consistent sequence of steps or instructions leading to a desired and/or expected result. The steps generally include physical manipulations of physical quantities. Usually, though not necessarily, these quantities take the form of electrical, magnetic, optical, or quantum signals capable of being stored, transferred, combined, compared, and otherwise manipulated in a computer, data processing system, or logic circuit. It has proven convenient at times, principally for reasons of common usage, to refer to these signals as bits, waves, waveforms, streams, values, elements, symbols, characters, terms, numbers, or the like.

It should be borne in mind, however, that all of these and similar terms are associated with the appropriate physical quantities and are merely convenient labels applied to these quantities. Unless specifically stated otherwise and/or as is apparent from the following discussions, it is appreciated that throughout the present application, discussions utilizing terms such as "processing," "operating," "computing," "calculating," "determining," "manipulating," "transforming," "displaying" or the like, refer to the action and processes of a computer, data processing system, logic circuit, controller, or similar processing device (e.g., an electrical, optical, or quantum computing or processing device), that manipulates and transforms data represented as physical (e.g., electronic) quantities. The terms refer to actions, operations and/or processes of the processing devices that manipulate or transform physical quantities within the component(s) of a system or architecture (e.g., registers, memories, other such information storage, transmission or display devices, etc.) into other data similarly represented as physical quantities within other components of the same or a different system or architecture.

Furthermore, for the sake of convenience and simplicity, the terms "connected to," "coupled with," "coupled to," and "in communication with" (which terms also refer to direct and/or indirect relationships between the connected, coupled and/or communication elements unless the context of the term's use unambiguously indicates otherwise), may be used interchangeably herein, but these terms are also generally given their art-recognized meanings.

An Exemplary Circuit

Figure 3A:
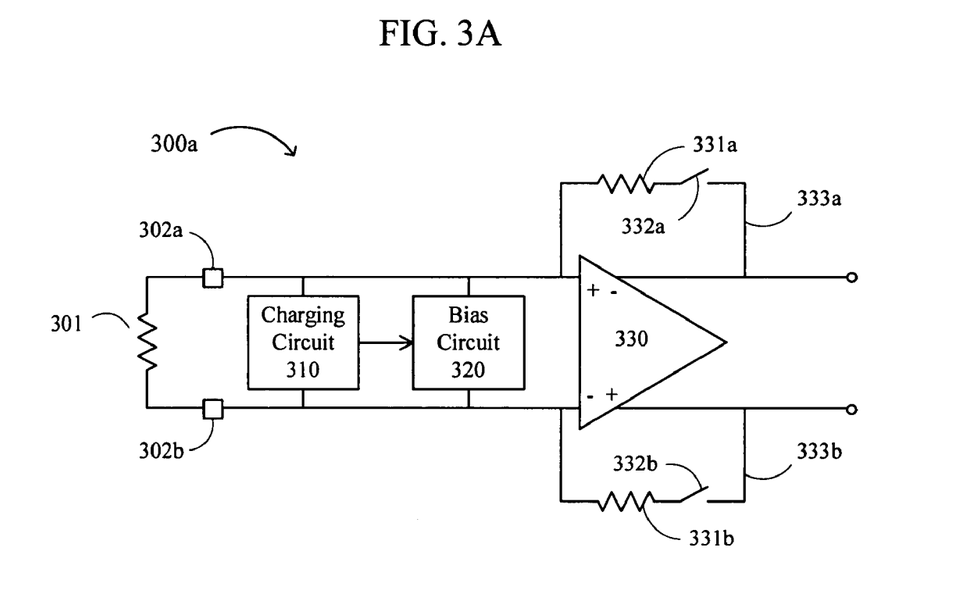
FIG. 3A is a diagram showing an embodiment of a differential preamplification circuit according to the present invention.

Referring now to FIG. 3A, an exemplary differential circuit 300a for generating bias across magneto-resistive (MR) sensor 301 is shown. The present invention may be implemented using a single-ended amplifier. However, the use of a differential amplifier is preferred. Circuit 300a includes MR sensor nodes 302a and 302b (e.g., for coupling to an external MR sensor 301), differential amplifier 330, feedback paths 333a and 333b, charging circuit 310, and bias circuit 320. Feedback paths 333a and 333b include feedback resistors 331a and 331b and feedback switches 332a and 332b, respectively. The feedback paths receive outputs from amplifier 330 and provide feedback outputs to nodes 302a and 302b of MR sensor 301. Charging circuit 310 is configured to generate a current, apply the current to MR sensor 301 (e.g., through MR sensor nodes 302a and 302b), and sample a voltage across the MR sensor 301 to produce a sampled voltage. The charging circuit generally operates while feedback switches 332a and 332b are open. Thus, the feedback resistors are isolated from MR sensor 301 while the charging circuit 310 samples the voltage. Bias circuit 320 is configured to apply a bias voltage across the MR sensor and to adjust the bias voltage to match the sampled voltage. Bias circuit 320 generally operates while the feedback switch is closed. Thus, the bias circuit compensates for bias error introduced by the feedback path by adjusting the bias voltage to match the sampled voltage (e.g., so that the voltage across the MR sensor is the same when the feedback path is activated as when the feedback path is deactivated).

Figure 3B:
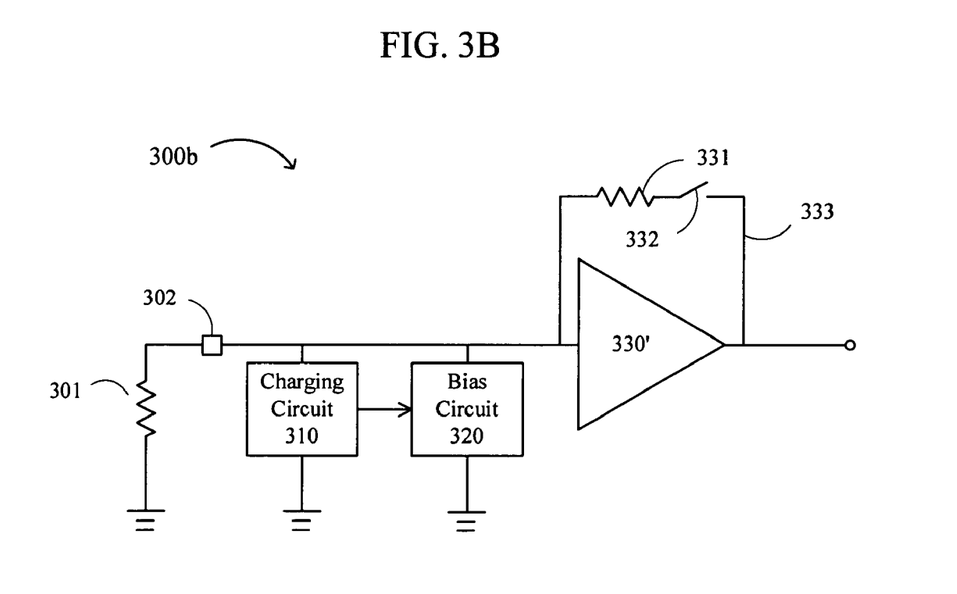
FIG. 3B is a diagram showing an embodiment of a single-ended preamplification circuit according to the present invention.

Referring now to FIG. 3B, a single-ended (e.g., non-differential) embodiment of preamplification circuit 300b is shown. Circuit 300b includes MR sensor node 302 (e.g., for coupling to an external MR sensor 301), single-ended amplifier 330', feedback path 333 charging circuit 310, and bias circuit 320. Feedback path 333 includes feedback resistor 331 and feedback switch 332. The feedback path 333 receives output from amplifier 330' and provides feedback output to node 302 of MR sensor 301. Charging circuit 310 is configured to generate a current, apply the current to MR sensor 301 (e.g., through MR sensor node 302), and sample a voltage across the MR sensor 301 to produce a sampled voltage (e.g., sample the voltage between MR sensor node 302 and ground). The charging circuit generally operates while feedback switch 332 is open. Thus, the feedback resistor is isolated from MR sensor 301 while the charging circuit 310 samples the voltage. Bias circuit 320 is configured to apply a bias voltage to the MR sensor 301 and to adjust the bias voltage to match the sampled voltage.

Figure 3C:
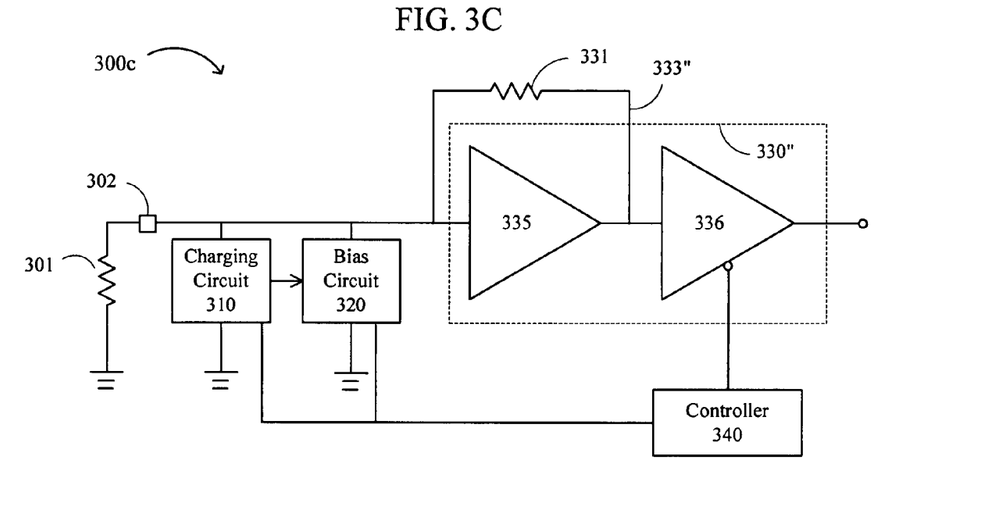
FIG. 3C is a diagram showing an embodiment of a single-ended preamplification circuit having an output driver and a controller according to the present invention.

Referring now to FIG. 3C, another single-ended embodiment of preamplification circuit 300c is shown. As shown in circuit 300c, amplifier 330" includes a variable gain amplifier 335 and an output driver 336. Controller 340 generally provides control signals to charging circuit 310, bias circuit 320, and output driver 336. Feedback path 333" may be deactivated by deactivating or three-stating output driver 336 (or by deactivating any appropriate stage of amplifier 330") instead of using a switch (e.g., switch 332 of FIG. 3B). In some implementations, this approach may be preferable (e.g., because having switching in the feedback path(s) may impede the performance of the circuit, particularly in very high frequency implementations). It will be recognized that this approach is also applicable to differential embodiments of a preamplifier circuit (e.g., as shown in FIG. 3A).

Circuit 300c also includes MR sensor node 302, feedback path 333 charging circuit 310, and bias circuit 320. Feedback path 333" includes feedback resistor 331 and feedback switch 332. The feedback path 333 receives output from output driver 336 and provides feedback output to node 302 of MR sensor 301. Controller 340 is configured to send a control signal to charging circuit 310 to generate a current, apply the current to MR sensor 301 (e.g., through MR sensor node 302), and sample a voltage across the MR sensor 301 to produce a sampled voltage (e.g., sample the voltage between MR sensor node 302 and ground). Controller 340 sends a control signal to deactivate output driver 336, thereby deactivating feedback path 333" (since effectively no current will flow through feedback resistor 331, while charging circuit 310 is operating. Thus, the feedback resistor 331 is effectively isolated from MR sensor 301 while the charging circuit 310 samples the voltage. Controller 340 then sends a control signal to activate output driver 336 and a control signal to cause bias circuit 320 to apply a bias voltage to the MR sensor 301 and to adjust the bias voltage to match the sampled voltage.

Figure 3D:
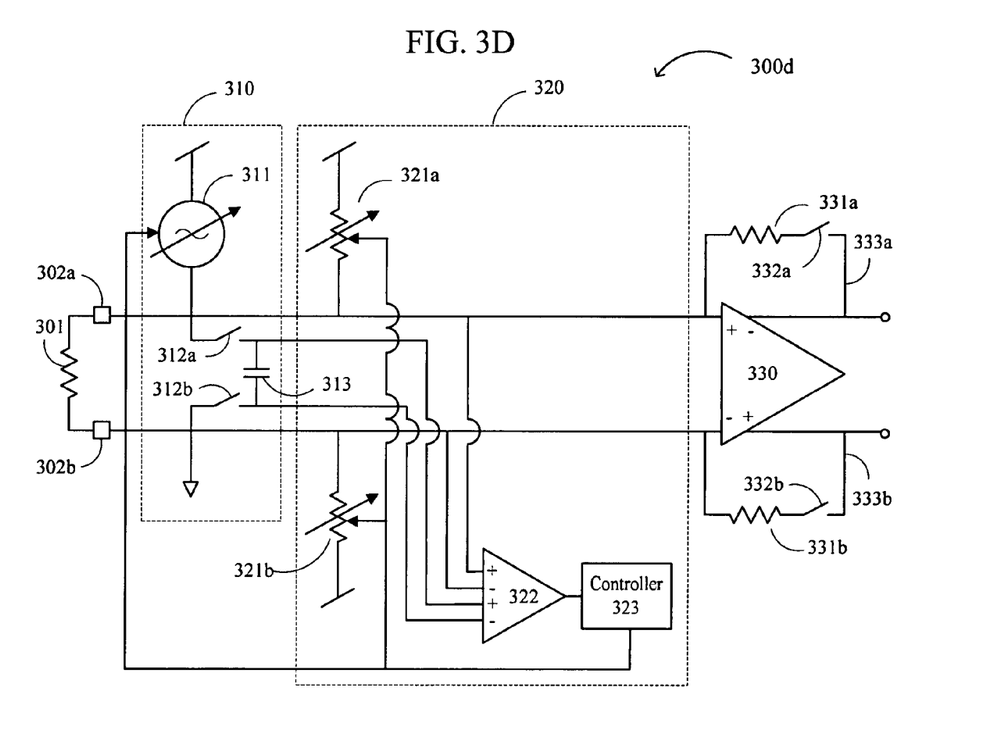
FIG. 3D is a more detailed diagram showing an embodiment of a circuit according to the present invention.

Referring now to FIG. 3D, another embodiment of a differential preamplification circuit 300d is shown. Charging circuit 310 may include a current digital-to-analog converter (DAC) 311. Circuit 300d may be configured to provide a bias current across MR sensor 301 by programming DAC 311 with digital value representing the desired current. Alternatively, circuit 300d may be configured to provide a bias voltage across MR sensor 301 by comparing the voltage across MR sensor 311 with a reference voltage, and adjusting DAC 311 until the voltage across MR sensor 311 is substantially equal to the reference voltage.

Charging circuit 310 may include sampling capacitor 313, coupled to MR sensor 301 through switches 312a and 312b. Charging circuit 310 may be configured to sample the voltage across MR sensor 301 by closing switches 312a and 312b to charge capacitor 313. After the switches are closed, the charge across capacitor 313 will dissipate over time. However, the calibration operation generally operates in a short enough time that this dissipation does not significantly affect the accuracy of the bias generation.

Bias circuit 320 may comprise voltage sources 321a and 321b, bias comparison circuit 322, and controller 323. Controller 323 may be configured to open feedback switches 332a and 332b, and activate charging circuit 310 to charge sampling capacitor 313 (e.g., by providing a current control signal to DAC 311 and closing switches 312a and 312b). After the sampling capacitor is charged, controller 323 may be configured to close feedback switches 332a and 332b, and activate the bias circuit to generate a voltage across MR sensor 301 that matches the sampled voltage. Thus, bias comparison circuit 322 is configured to compare the sampled voltage (e.g., the voltage across the sampling capacitor 313) to the bias voltage. Voltage sources 321a and 321b may be voltage digital-to-analog converters (DACs) having digital control inputs. Controller 323 may be configured to change a value of the digital control input response to an output of the bias comparison circuit.

Exemplary Methods

Figure 4:
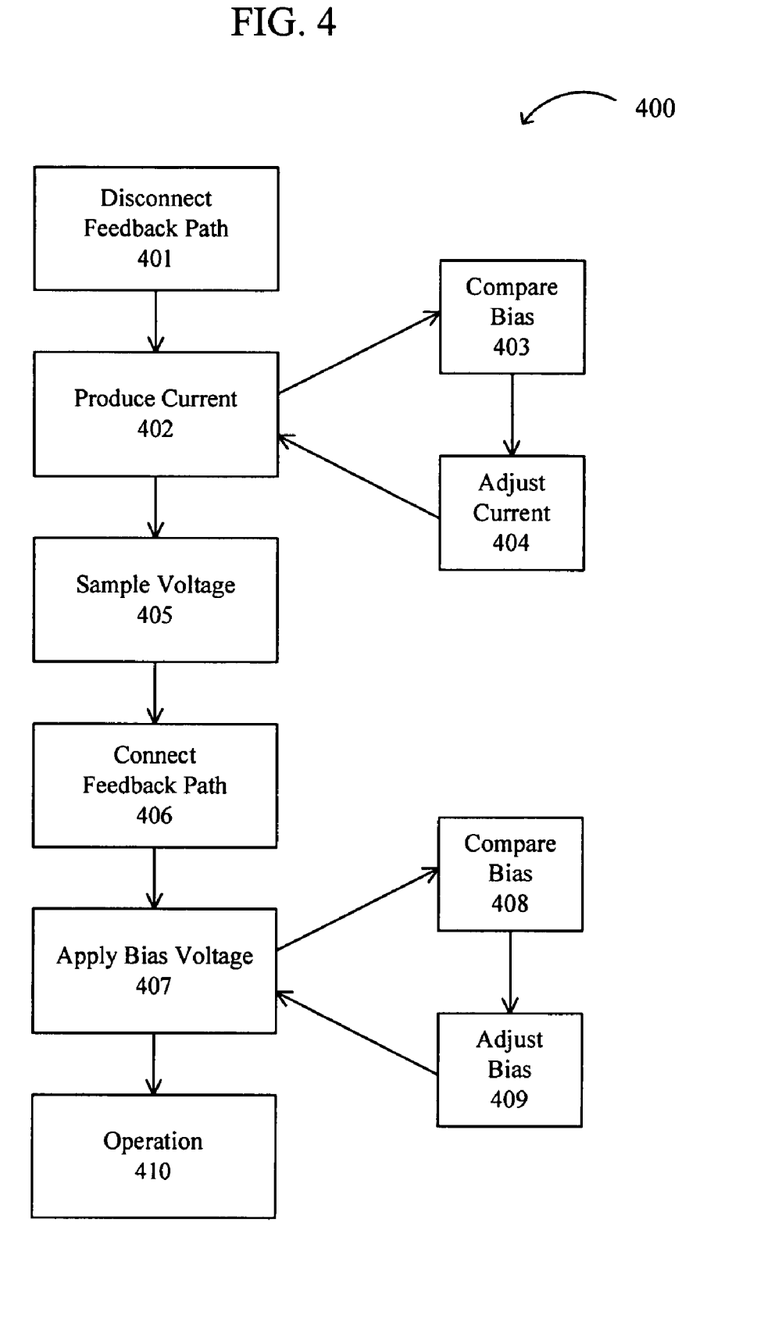
FIG. 4 is a flowchart showing a method of calibrating bias for a magneto-resistive (MR) sensor according to the present invention.

Referring now to FIG. 4, an exemplary method 400 for providing a bias voltage to a magneto-resistive (MR) sensor is shown. At step 401, a feedback path (e.g., feedback path 333a of FIG. 3D) between an amplifier output and the MR sensor is deactivated. As shown in FIG. 3D, the feed back path feedback path 333a may comprise a feedback switch 332a and a feedback resistor 331a, so that the step 401 of deactivating the feedback path comprises opening the feedback switch 332a. Alternatively, as shown in FIG. 3C, the amplifier 330" may have an output driver 336, and step 401 of deactivating the feedback path may comprise deactivating output driver 336. Referring again to FIG. 4, while the feedback path is deactivated, step 402 includes producing an electrical current and applying the electrical current to the MR sensor.

In some embodiments, step 402 of producing the electrical current may include generating the electrical current in response to a charging control input. The method may operate in either a current mode of operation (e.g., where the charging control input specifies a desired bias current across the MR sensor) or a voltage mode of operation (e.g., where the charging control input specifies a desired bias voltage across the MR sensor). Thus, the charging control input may comprise a digital representation of a predetermined current. Alternatively, the charging control input may comprise a reference voltage, or the method may comprise generating a reference voltage in accordance with the charging control input. Step 402 may include an iterative loop of step 403 of comparing the reference voltage to the voltage across the MR sensor, and step 404 of adjusting current in response to the comparing step. The loop of steps 402, 403, and 404 may continue until the voltage across the MR sensor is substantially equal to the reference voltage.

Step 405 includes sampling a voltage across the MR sensor to produce a sampled voltage. Thus, the sampled voltage represents the voltage across the MR sensor while no error can be introduced by the feedback path. In a preferred embodiment, sampling the voltage across the MR sensor comprises charging a sampling capacitor up to the sampled voltage. Thus, the charging step may comprise coupling a first node of the capacitor to a first node of the MR sensor and coupling a second node of the capacitor to a second node of the MR sensor.

Next, in step 406 the feedback path is activated (e.g., by closing switch 331a of FIG. 3D and/or by activating output driver 340 of FIG. 3C). With the feedback path reactivated, step 407 includes applying a bias voltage to the MR sensor. Step 407 includes an iterative loop of step 408 of comparing the bias voltage to the sampled voltage (e.g., the voltage across sampling capacitor 313), and step 409 of adjusting the bias voltage to match the sampled voltage. The loop of steps 407, 408, and 409 may continue until the bias voltage across the MR sensor is substantially equal to the sampled voltage. In a preferred embodiment, adjusting step 408 comprises changing the bias voltage by a relatively small amount, and repeating the comparing and adjusting until the bias voltage is substantially equal to the sampled voltage.

Thus, the present method allows for accurate calibration of the bias across and MR sensor by isolating the feedback path of the preamplifier (and thus removing any error introduced by the preamplifier) and then adjusting the bias to compensate for the error after the feedback path is reactivated. After the calibration of the bias is complete, the method includes step 410 of normal operation of the preamplifier circuit.

Exemplary Systems

Figure 5A:
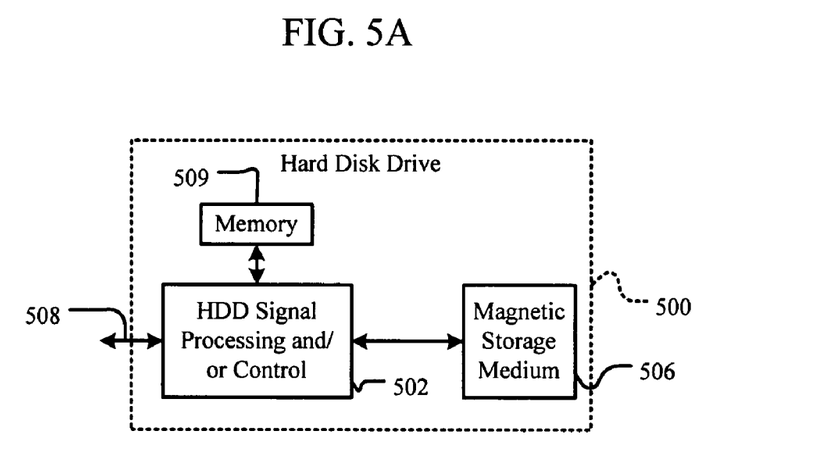
FIG. 5A is a diagram of an exemplary hard disk drive (HDD).

Various exemplary implementations of the present invention are shown in FIGS. 5A-5G. Referring now to FIG. 5A, the present invention can be implemented in a hard disk drive (HDD) 500. Specifically the present invention relates to a hard disk drive comprising the preamplifier circuit presented herein. The present invention may be implemented in a preamplifier circuit in signal processing and/or control unit 502, including an MR sensor configured to sense changes in a magnetic field on the magnetic storage medium 506. In some implementations, the signal processing and/or control circuit 502 and/or other circuits (not shown) in the HDD 500 may process data, perform coding and/or encryption, perform calculations, and/or format data that is output to and/or received from a magnetic storage medium 506.

The HDD 500 may communicate with a host device (not shown) such as a computer, mobile computing devices such as personal digital assistants, cellular phones, media or MP3 players and the like, and/or other devices via one or more wired or wireless communication links 508. The HDD 500 may be connected to memory 509 such as random access memory (RAM), nonvolatile memory such as flash memory, read only memory (ROM), and/or other suitable electronic data storage.

Figure 5B:
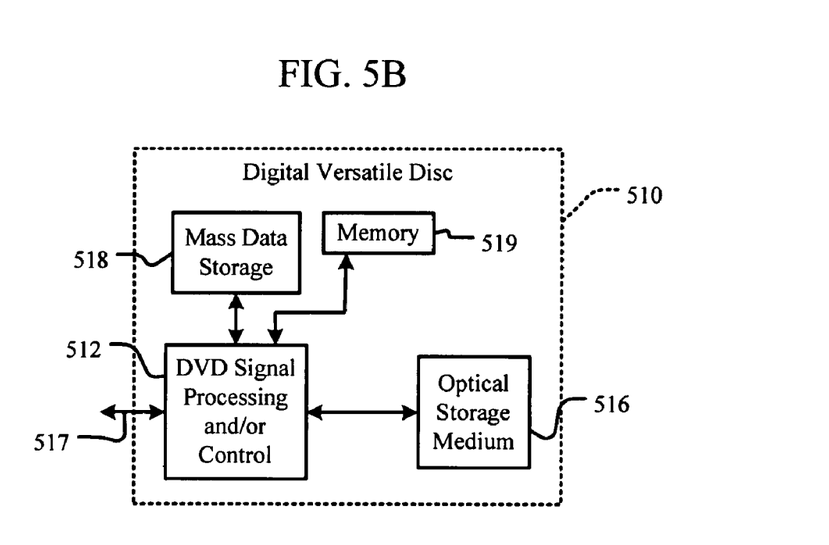
FIG. 5B is a diagram of an exemplary digital versatile disc (DVD) player.

Referring now to FIG. 5B, the present invention can be implemented in a digital versatile disc (DVD) drive 510. The present invention may be implemented in either or both signal processing and/or control circuits, which are generally identified in FIG. 5B at 512, and/or mass data storage of the DVD drive 510. The signal processing and/or control circuit 512 and/or other circuits (not shown) in the DVD 510 may process data, perform coding and/or encryption, perform calculations, and/or format data that is read from and/or data written to an optical storage medium 516. In some implementations, the signal processing and/or control circuit 512 and/or other circuits (not shown) in the DVD 510 can also perform other functions such as encoding and/or decoding and/or any other signal processing functions associated with a DVD drive.

The DVD drive 510 may communicate with an output device (not shown) such as a computer, television or other device via one or more wired or wireless communication links 517. The DVD 510 may communicate with mass data storage 518 that stores data in a nonvolatile manner. The mass data storage 518 may include a hard disk drive (HDD). The HDD may have the configuration shown in FIG. 5A. The HDD may comprise one or more power bias generating circuits according to the present invention for MR read/write heads and/or fly height armature heater coils in the HDD as described above. The HDD may be a mini HDD that includes one or more platters having a diameter that is smaller than approximately 1.8". The DVD 510 may be connected to memory 519 such as RAM, ROM, nonvolatile memory such as flash memory and/or other suitable electronic data storage.

Figure 5C:
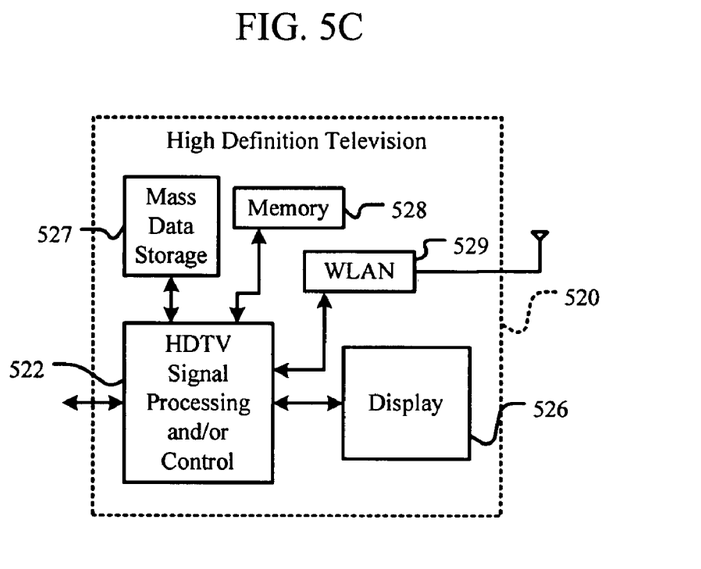
FIG. 5C is a diagram of an exemplary high definition television (HDTV).

Referring now to FIG. 5C, the present invention can be implemented in a high definition television (HDTV) 520. The present invention may be implemented in either or both signal processing and/or control circuits, which are generally identified in FIG. 5C at 522, a WLAN interface 529 and/or mass data storage 427 of the HDTV 520. The HDTV 520 receives HDTV input signals in either a wired or wireless format and generates HDTV output signals for a display 526. In some implementations, signal processing circuit and/or control circuit 522 and/or other circuits (not shown) of the HDTV 520 may process data, perform coding and/or encryption, perform calculations, format data and/or perform any other type of HDTV processing that may be required.

The HDTV 520 may communicate with mass data storage 527 that stores data in a nonvolatile manner such as optical and/or magnetic storage devices. At least one HDD may have the configuration shown in FIG. 5A and/or at least one DVD may have the configuration shown in FIG. 5B. The HDD may comprise one or more power bias generating circuits according to the present invention for MR read/write heads and/or fly height armature heater coils in the HDD as described above. The HDD may be a mini HDD that includes one or more platters having a diameter that is smaller than approximately 1.8". The HDTV 520 may be connected to memory 528 such as RAM, ROM, nonvolatile memory such as flash memory and/or other suitable electronic data storage. The HDTV 520 also may support connections with a WLAN via a WLAN network interface 529.

Figure 5D:
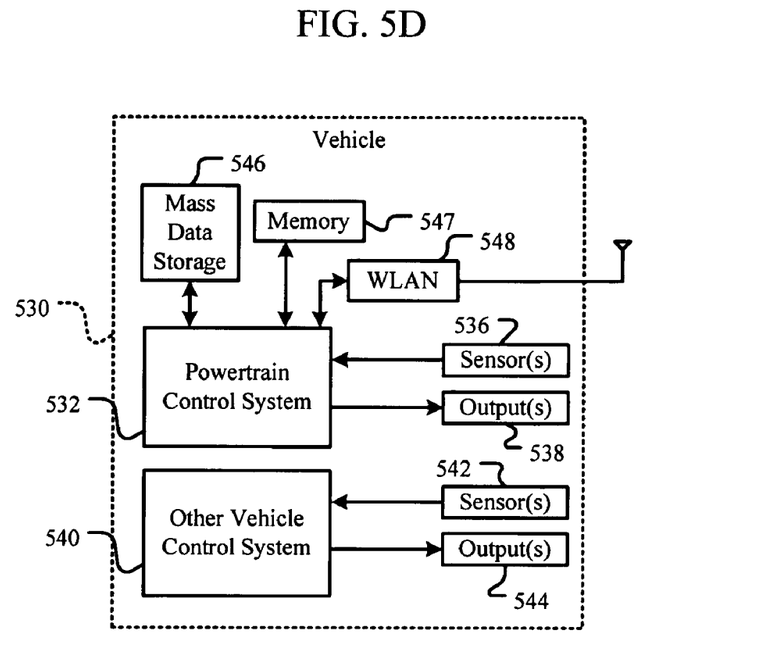
FIG. 5D is a diagram of an exemplary vehicle control system.

Referring now to FIG. 5D, the present invention may be implemented in a control system of a vehicle 530, a WLAN interface 548, and/or mass data storage 546 of the vehicle control system. In some implementations, the present invention may be implemented in powertrain control system 532 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The present invention may also be implemented in other control systems 540 of the vehicle 530. The control system 540 may likewise receive signals from input sensors 542 and/or output control signals to one or more output devices 544. In some implementations, the control system 540 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 532 may communicate with mass data storage 546 that stores data in a nonvolatile manner. The mass data storage 546 may include optical and/or magnetic storage devices (for example, hard disk drives [HDDs] and/or DVDs). At least one HDD may have the configuration shown in FIG. 5A and/or at least one DVD may have the configuration shown in FIG. 5B. The HDD may comprise one or more power bias generating circuits according to the present invention for MR read/write heads and/or fly height armature heater coils in the HDD as described above. The HDD may be a mini HDD that includes one or more platters having a diameter that is smaller than approximately 1.8". The powertrain control system 532 may be connected to memory 547 such as RAM, ROM, low latency nonvolatile memory such as flash memory and/or other suitable electronic data storage. The powertrain control system 532 also may support connections with a WLAN via a WLAN network interface 548. The control system 540 may also include mass data storage, memory and/or a WLAN interface (all not shown).

Figure 5E:
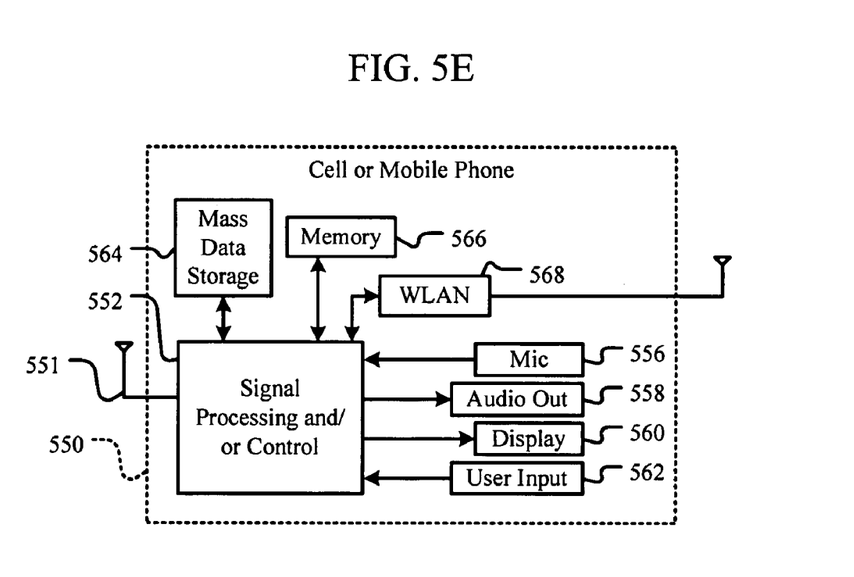
FIG. 5E is a diagram of an exemplary cellular or mobile phone.

Referring now to FIG. 5E, the present invention can be implemented in a cellular or mobile phone 550 that may include an antenna 551. The present invention may be implemented in either or both signal processing and/or control circuits, which are generally identified in FIG. 5E at 552, a WLAN interface 568 and/or mass data storage 564 of the phone 550. In some implementations, the phone 550 includes a microphone 556, an audio output 558 such as a speaker and/or audio output jack, a display 560 and/or an input device 562 such as a keypad, pointing device, voice actuation and/or other input device. The signal processing and/or control circuits 552 and/or other circuits (not shown) in the phone 550 may process data, perform coding and/or encryption, perform calculations, format data and/or perform other phone functions.

The phone 550 may communicate with mass data storage 564 that stores data in a nonvolatile manner such as optical and/or magnetic storage devices (for example, hard disk drives [HDDs] and/or DVDs). At least one HDD may have the configuration shown in FIG. 5A and/or at least one DVD may have the configuration shown in FIG. 5B. The HDD may comprise one or more power bias generating circuits according to the present invention for MR read/write heads and/or fly height armature heater coils in the HDD as described above. The HDD may be a mini HDD that includes one or more platters having a diameter that is smaller than approximately 1.8". The phone 550 may be connected to memory 566 such as RAM, ROM, nonvolatile memory such as flash memory and/or other suitable electronic data storage. The phone 550 also may support connections with a WLAN via a WLAN network interface 568.

Figure 5F:
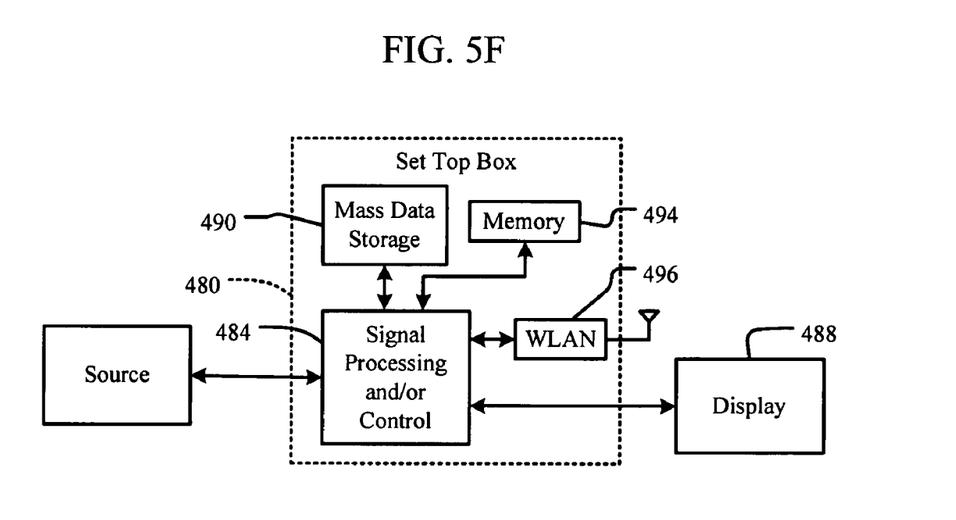
FIG. 5F is a diagram of an exemplary television set top box.

Referring now to FIG. 5F, the present invention can be implemented in a set top box 580. The present invention may be implemented in either or both signal processing and/or control circuits, which are generally identified in FIG. 5F at 584, a WLAN interface 596 and/or mass data storage 590 of the set top box 580. The set top box 580 receives signals from a source such as a broadband source and outputs standard and/or high definition audio/video signals suitable for a display 588 such as a television and/or monitor and/or other video and/or audio output devices. The signal processing and/or control circuits 584 and/or other circuits (not shown) of the set top box 580 may process data, perform coding and/or encryption, perform calculations, format data and/or perform any other set top box function.

The set top box 580 may communicate with mass data storage 590 that stores data in a nonvolatile manner. The mass data storage 590 may include optical and/or magnetic storage devices (for example, hard disk drives [HDDs] and/or DVDs). At least one HDD may have the configuration shown in FIG. 5A and/or at least one DVD may have the configuration shown in FIG. 5B. The HDD may comprise one or more power bias generating circuits according to the present invention for MR read/write heads and/or fly height armature heater coils in the HDD as described above. The HDD may be a mini HDD that includes one or more platters having a diameter that is smaller than approximately 1.8". The set top box 580 may be connected to memory 594 such as RAM, ROM, nonvolatile memory such as flash memory and/or other suitable electronic data storage. The set top box 580 also may support connections with a WLAN via a WLAN network interface 596.

Referring now to FIG. 5F, the present invention can be implemented in a media player 600. The present invention may be implemented in either or both signal processing and/or control circuits, which are generally identified in FIG. 5G at 604, WLAN interface 616 and/or mass data storage 610 of the media player 600. In some implementations, the media player 600 includes a display 607 and/or a user input 608 such as a keypad, touchpad and the like. In some implementations, the media player 600 may employ a graphical user interface (GUI) that typically employs menus, drop down menus, icons and/or a point-and-click interface via the display 607 and/or user input 608. The media player 600 further includes an audio output 609 such as a speaker and/or audio output jack. The signal processing and/or control circuits 604 and/or other circuits (not shown) of the media player 600 may process data, perform coding and/or encryption, perform calculations, format data and/or perform any other media player function.

Figure 5G:
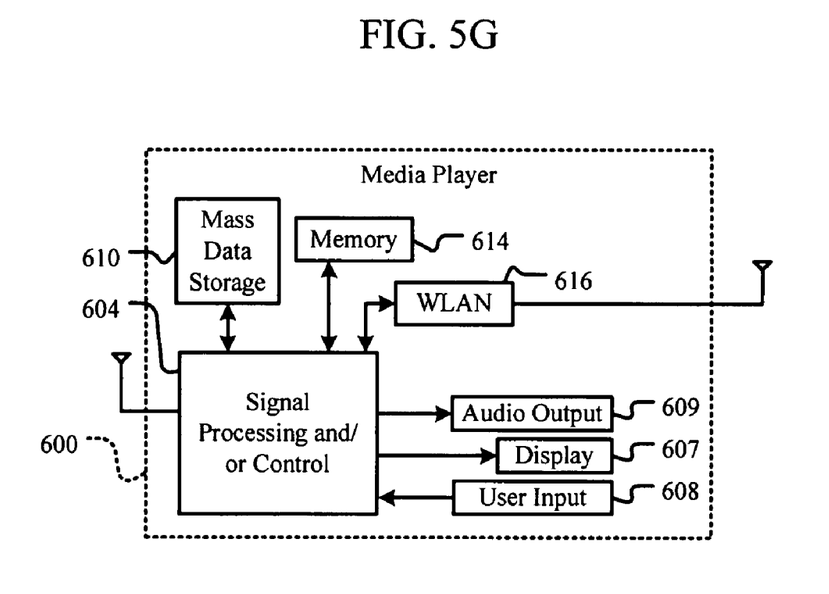
FIG. 5G is a diagram of an exemplary portable media player.

The media player 600 may communicate with mass data storage 610 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices (for example, hard disk drives [HDDs] and/or DVDs). At least one HDD may have the configuration shown in FIG. 5A and/or at least one DVD may have the configuration shown in FIG. 5B. The HDD may comprise one or more power bias generating circuits according to the present invention for MR read/write heads and/or fly height armature heater coils in the HDD as described above. The HDD may be a mini HDD that includes one or more platters having a diameter that is smaller than approximately 1.8". The media player 600 may be connected to memory 614 such as RAM, ROM, nonvolatile memory such as flash memory and/or other suitable electronic data storage. The media player 600 also may support connections with a WLAN via a WLAN network interface 616. Still other implementations in addition to those described above are contemplated.

CONCLUSION/SUMMARY

Thus, the present invention provides circuits, systems, and methods for generating and calibrating bias for a magnetoresistive (MR) sensor. The present invention advantageously provides for fast and accurate calibration of bias across an MR sensor that compensates for bias error introduced by the feedback path.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A preamplifier circuit in a magnetic storage system, comprising:
   an amplifier having an input coupled to a first magnetoresistive (MR) sensor node;

a first feedback path comprising a feedback resistor, said first feedback path configured to receive an amplifier output from said amplifier and to provide a feedback output to said first MR sensor node;

a charging circuit configured to generate a current, apply said current to said first MR sensor node, and sample a voltage between said first MR sensor node and a second MR sensor node to produce a sampled voltage, said charging circuit operating when said first feedback path is in an inactive state; and a bias circuit configured to apply a bias voltage across said first and second MR sensor nodes and to adjust said bias voltage to match said sampled voltage, said bias circuit operating when said first feedback path is in an active state.

2. The preamplifier circuit of claim 1, wherein said charging circuit comprises a current digital-to-analog converter (DAC).

3. The preamplifier circuit of claim 1, wherein said charging circuit comprises a charging control input and wherein said charging circuit is further configured to generate said current in response to said charging control input.

4. The preamplifier circuit of claim 3, wherein said charging control input comprises a reference voltage.

5. The preamplifier circuit of claim 3, wherein said charging circuit comprises a voltage source configured to generate a reference voltage in accordance with said charging control input.

6. The preamplifier circuit of claim 5, wherein said voltage source comprises a digital-to-analog converter, and said charging control input comprises a digital representation of a predetermined voltage.

7. The preamplifier circuit of claim 5, wherein said charging circuit further comprises a charging comparison circuit configured to compare said reference voltage to said voltage across said first and second MR sensor nodes.

8. The preamplifier circuit of claim 7, wherein said charging circuit is further configured to adjust said current in response to an output of said charging comparison circuit.

9. The preamplifier circuit of claim 1, wherein said charging circuit comprises a capacitor configured to charge up to said sampled voltage.

10. The preamplifier circuit of claim 9, wherein said capacitor has a first node coupled to said first MR sensor node through a first sampling switch and a second node coupled to said second MR sensor node through a second sampling switch.

11. The preamplifier circuit of claim 1, further comprising a control circuit configured to cause said first feedback path to enter said inactive state, activate said charging circuit, cause said first feedback path to enter said active state, and activate said bias circuit.

12. The preamplifier circuit of claim 11, wherein said control circuit comprises a bias comparison circuit configured to compare said sampled voltage to said bias voltage.

13. The preamplifier circuit of claim 12, wherein said bias circuit comprises a voltage digital-to-analog converter (DAC) having a digital control input, and said controller is configured to change a value of said digital control input in response to an output of said bias comparison circuit.

14. The preamplifier circuit of claim 1, wherein said amplifier comprises a single-ended amplifier, and said second MR sensor node is coupled to a ground potential.

15. The preamplifier circuit of claim 1, wherein said amplifier comprises a differential amplifier.

16. The preamplifier circuit of claim 15, further comprising a second feedback path configured to receive a second output from said differential amplifier and to provide a second feedback output to said second MR sensor node.

17. The preamplifier circuit of claim 1, wherein:
said first feedback path further comprises a feedback switch;
said first feedback path is in said active state when said feedback switch is closed; and
said first feedback path is in said inactive state when said feedback switch is open.

18. The preamplifier circuit of claim 1, further comprising an output driver receiving said amplifier output, wherein said feedback path is in said active state when said output driver is active, and said feedback path is in said inactive state when said output driver is inactive.

19. An integrated circuit comprising the preamplifier circuit of claim 1.

20. A hard disk drive comprising the preamplifier circuit of claim 1.

21. A digital versatile disc (DVD) recorder comprising the preamplifier circuit of claim 1.

22. A television receiver comprising the preamplifier circuit of claim 1.

23. A high definition television (HDTV) receiver comprising the preamplifier circuit of claim 1.

24. A motor vehicle control system comprising the preamplifier circuit of claim 1.

25. A cellular telephone comprising the preamplifier circuit of claim 1.

26. A mobile telephone comprising the preamplifier circuit of claim 1.

27. A set top box comprising the preamplifier circuit of claim 1.

28. A media player comprising the preamplifier circuit of claim 1.

29. A magnetic storage system comprising:
a magnetic storage medium;
a preamplifier circuit comprising:
an amplifier having an input coupled to a first magneto-resistive (MR) sensor node,
a first feedback path comprising a feedback resistor, said path configured to receive an amplifier output from said amplifier and to provide a feedback output to said first MR sensor node,
a charging circuit configured to generate a current, apply said current to said first MR sensor node, and sample a voltage between said first MR sensor node and a second MR sensor node to produce a sampled voltage, said charging circuit operating when said feedback path is in an inactive state, and
a bias circuit configured to apply a bias voltage across said first and second MR sensor nodes and to adjust said bias voltage to match said sampled voltage, said bias circuit operating when said feedback path is in an active state; and
a magneto-resistive (MR) sensor coupled to said first and second MR sensor nodes, wherein said MR sensor is configured to sense changes in a magnetic field on said magnetic storage medium.

30. A method of calibrating bias for a magneto-resistive (MR) sensor, said method comprising:
deactivating a feedback path between an amplifier output and said MR sensor and, while said feedback path is deactivated, producing an electrical current, applying said electrical current to said MR sensor, and sampling a voltage across said MR sensor to produce a sampled voltage; and activating said feedback path and, while said feedback path is activated, applying a bias voltage to said MR sensor, comparing said bias voltage to said sampled voltage, and adjusting said bias voltage to match said sampled voltage.

31. The method of claim 30, wherein producing said electrical current comprises generating said electrical current in response to a charging control input.

32. The method of claim 31, wherein said charging control input comprises a reference voltage.

33. The method of claim 30, comprising generating a reference voltage in accordance with said charging control input.

34. The method of claim 33, further comprising comparing said reference voltage to said voltage across said MR sensor.

35. The method of claim 34, further comprising adjusting said current in response to said comparing.

36. The method of claim 30, wherein said sampling comprises charging a capacitor up to said sampled voltage.

37. The method of claim 36, wherein said charging comprises coupling a first node of said capacitor to a first node of said MR sensor and coupling a second node of said capacitor to a second node of said MR sensor.

38. The method of claim 30, wherein said feedback path comprises a feedback switch and a feedback resistor, and said deactivating comprises opening said feedback switch.

39. The method of claim 30, wherein an output driver receives said amplifier output, and said deactivating comprises deactivating said output driver.

40. The method of claim 30, wherein said adjusting comprises changing said bias voltage by a first predetermined increment, and further comprising repeating said comparing and adjusting until said bias voltage is substantially equal to said sampled voltage.

* * * * *